US010533714B2

(12) United States Patent
Rowles et al.

(10) Patent No.: US 10,533,714 B2
(45) Date of Patent: Jan. 14, 2020

(54) EXTERNAL LIGHTING CASES FOR MOBILE DIGITAL CAMERA DEVICES

(71) Applicant: Vision Quest, Inc., Cupertino, CA (US)

(72) Inventors: John W. Rowles, Cupertino, CA (US); Kyaw Z. Min, San Jose, CA (US)

(73) Assignee: VisionQuest Imaging, Inc., Cupertino, CA (US)

( * ) Notice: Subject to any disclaimer, the term of this patent is extended or adjusted under 35 U.S.C. 154(b) by 10 days.

(21) Appl. No.: 15/855,960

(22) Filed: Dec. 27, 2017

(65) Prior Publication Data
US 2018/0135815 A1 May 17, 2018

Related U.S. Application Data

(63) Continuation of application No. 14/708,238, filed on May 9, 2015, now abandoned.
(Continued)

(51) Int. Cl.
F21L 4/04 (2006.01)
F21V 23/00 (2015.01)
F21V 23/06 (2006.01)
F21V 19/02 (2006.01)
F21V 5/00 (2018.01)
F21L 4/08 (2006.01)
F21L 4/02 (2006.01)
F21V 19/00 (2006.01)
(Continued)

(52) U.S. Cl.
CPC ................ F21L 4/04 (2013.01); F21L 4/02 (2013.01); F21L 4/08 (2013.01); F21V 5/006 (2013.01); F21V 5/007 (2013.01); F21V 19/004 (2013.01); F21V 19/02 (2013.01); F21V 23/009 (2013.01); F21V 23/06 (2013.01); F21Y 2103/00 (2013.01); F21Y 2105/00 (2013.01)

(58) Field of Classification Search
CPC ...... F21V 33/0052; F21V 5/006; F21V 5/007; F21V 19/004; F21V 19/02; F21V 23/009; F21V 23/06; F21L 4/04; F21L 4/08
See application file for complete search history.

(56) References Cited

U.S. PATENT DOCUMENTS 7,612,997 B1 11/2009 Diebel et al.
8,390,255 B1 3/2013 Fathollahi
(Continued)

OTHER PUBLICATIONS

Lenviar; "Meridian Iphone 5 Power Case", Data Sheet, Model BC5, BC5R,BC5W, BC5G; Downloaded Oct. 28, 2015; 1 page.
(Continued)

Primary Examiner — Britt D Hanley
Assistant Examiner — Nathaniel J Lee
(74) Attorney, Agent, or Firm — Alford Law Group, Inc.; William E. Alford; Vy H. Vu

(57) ABSTRACT

In one embodiment of the invention, an external lighting accessory system is disclosed. The system includes an enclosure; an array of light sources such as LEDs mounted in the enclosure; diffusion and/or lenses to direct the lighting. The light sources are pivotal and can be positioned to allow the user to move them to direct the lighting to the front illuminating the field of view for the front camera or to the rear illuminating the field of view for the rear camera. The lighting array of lights is adjustable based on software or hardware controls to provide lighting based on user's intent.

18 Claims, 17 Drawing Sheets

Related U.S. Application Data

(60) Provisional application No. 61/991,482, filed on May 10, 2014.

(51) Int. Cl.
*F21Y 105/00* (2016.01)
*F21Y 103/00* (2016.01)

(56) References Cited

U.S. PATENT DOCUMENTS

| | | |
|---|---|---|
| 2003/0096642 A1 | 5/2003 | Bessa et al. |
| 2003/0218689 A1 | 11/2003 | Angeli et al. |
| 2005/0007778 A1 | 1/2005 | Lin |
| 2005/0280014 A1* | 12/2005 | Park ............... H01L 33/483 257/98 |
| 2011/0188845 A1* | 8/2011 | Hanayama ........... G03B 15/05 396/155 |
| 2013/0201653 A1* | 8/2013 | Shoemake ........... G03B 15/02 362/3 |
| 2016/0274442 A1 | 9/2016 | Rausch et al. |

OTHER PUBLICATIONS

Lenviar; "Meridian-Iphone 5/5s Power Case", User Manual; Models BC5/R/W/G; Downloaded Oct. 28, 2015; 3 pages.

\* cited by examiner

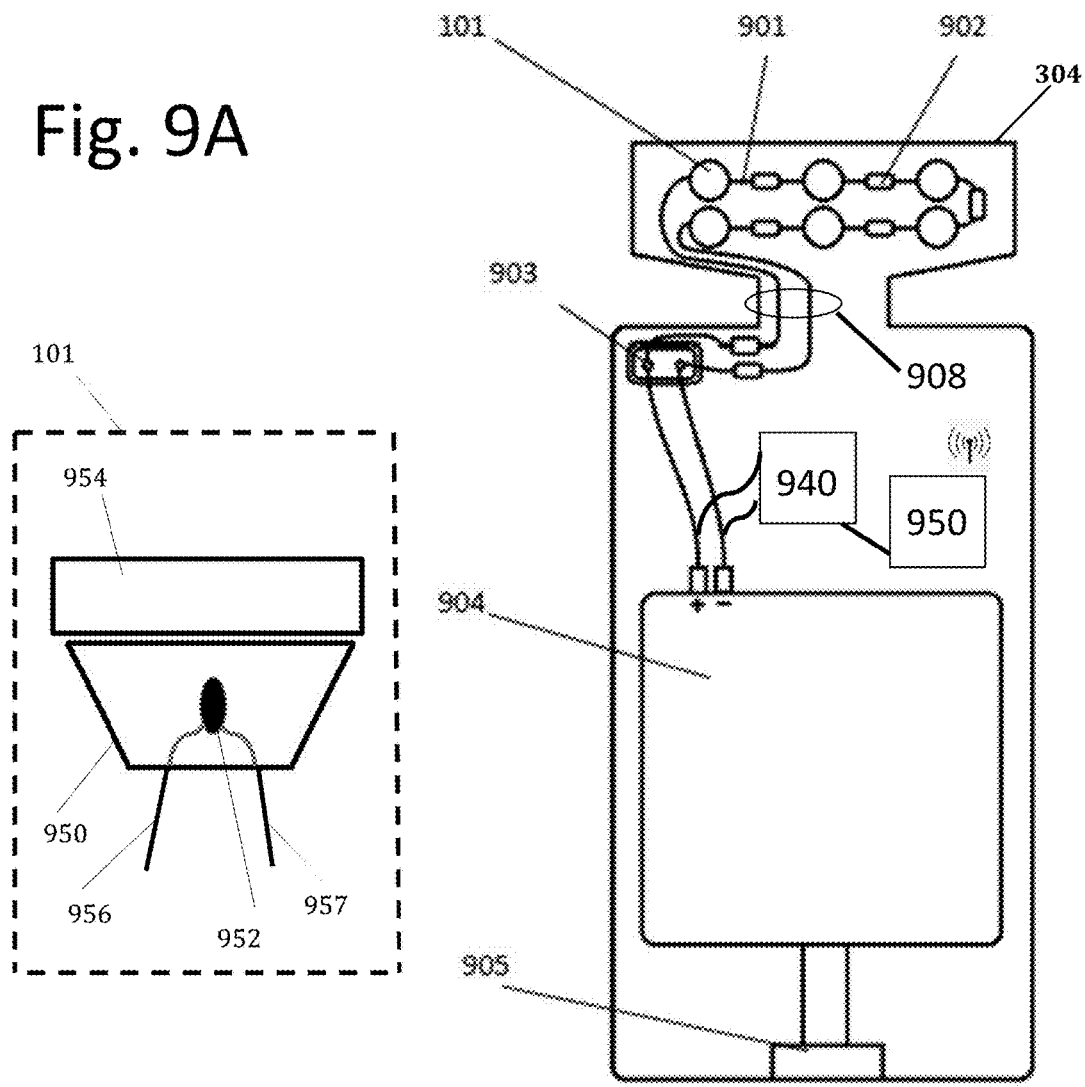

EXTERNAL LIGHTING CASES FOR MOBILE DIGITAL CAMERA DEVICES

CROSS-REFERENCE TO RELATED APPLICATIONS

This non-provisional United States (U.S.) patent application is a continuation and claims the benefit of U.S. patent application Ser. No. 14/708,238 filed on May 9, 2015 by John W. Rowles, et al., entitled EXTERNAL LIGHTING ACCESSORIES FOR MOBILE DIGITAL CAMERA DEVICES. U.S. patent application Ser. No. 14/708,238 claims the benefit of U.S. Provisional Patent Application No. 61/991,482 filed on May 10, 2014 by John W. Rowles, et al., entitled EXTERNAL LIGHTING ACCESSORY FOR MOBILE DEVICES WITH CAMERAS, which is incorporated herein by reference for all purposes.

FIELD OF THE INVENTION

The embodiments of the invention generally relate to photographic lighting for digital cameras.

BACKGROUND

It is a well known that poor lighting conditions can degrade the quality of digital images captured using digital image sensors. Small form factor cameras included in mobile or portable devices, such as those found in mobile phones and tablets, can exacerbate the issue. The race to shrink the form factor of mobile devices has led to smaller pixel sizes to reduce image sensor sizes, lower stack height of lenses (resulting in poor performing lenses), and smaller apertures to improve depth of field. While these changes have led to smaller camera modules, they have also led to poorer signal-to-noise ratio (SNR) as digital image sensors struggle to capture enough photons to produce signals stronger than the inherent noise within the camera system. As the lighting strength gets weaker this problem worsens exponentially.

While the digital imaging field struggles to deal with these issues through better sensor design and more robust algorithms, the simplest solution is to improve the incoming light signal to the image sensor. One method to improve the incoming reflected light signal is to increase the light level on the objects in the scene from which light is to be reflected and captured by the image sensor.

Mobile phones provide a small built in light source on the rear of the phone to accompany a rear camera for flash photography. However, these small built in light sources often have limitations in form factor and aesthetic design, as well as power and low cost requirements. As a result, these small built in light sources are typically very weak and often poorly designed for their intended purpose. These small built in light sources are usually utilized as a last resort, when no other lighting is provided around the mobile phone.

Smart phones and tablets often have a front camera that is used to capture a user's face for self portraits or video conferencing. Mobile device manufacturers assume that the user will use the front camera in well lighted conditions and thus do not provide a front built-in light source. The front camera is often smaller than the rear camera in a smart phone due to design limitations and aesthetics. Thus, without any front built-in light source, front facing cameras often do not capture images very well in dim or dark lighting conditions.

BRIEF DESCRIPTION OF THE DRAWINGS

The embodiments of the invention are illustrated by way of example, and not limitation, in the figures of the accompanying drawings in which like references indicate similar elements and in which:

FIG. 9A illustrates a diagram of a light source that may be used as the front and/or back light sources.

FIG. 9B illustrates a schematic diagram of electronic components and their connections within an external lighting accessory/case.

DETAILED DESCRIPTION

In the following detailed description of the embodiments of the invention, numerous specific details are set forth in order to provide a thorough understanding of the aspects of the invention. However, it will be obvious to one skilled in the art that the embodiments of the invention may be practiced without these specific details. In other instances well known methods, procedures, components, and circuits have not been described in detail so as not to unnecessarily obscure aspects of the invention.

Reference in the specification to "one embodiment" or "an embodiment" means that a particular aspect, feature, structure, or characteristic is described in connection with at least one embodiment of the invention. The appearances of the phrase "in one embodiment" in various places in the specification do not necessarily all refer to the same embodiment. Moreover, aspects, features, structures, or characteristics described with regard to one embodiment of the invention may be shared or included and claimed as part of another embodiment of the invention.

INTRODUCTION

Extremely compact design prioritizing small form factor and aesthetics that is prevalent in the current mobile phone and tablet market simply does not accommodate the lighting needs of the built-in digital camera. Therefore, the ideal solution is to fulfill this need with an external accessory case or an attachment device that has strong effective light sources. The light sources provide improved image quality for the built-in digital camera of the mobile digital camera device through higher brightness and better color balance than that provided by typical built-in light sources in the mobile digital camera device.

External Lighting Accessory

Figure 1:
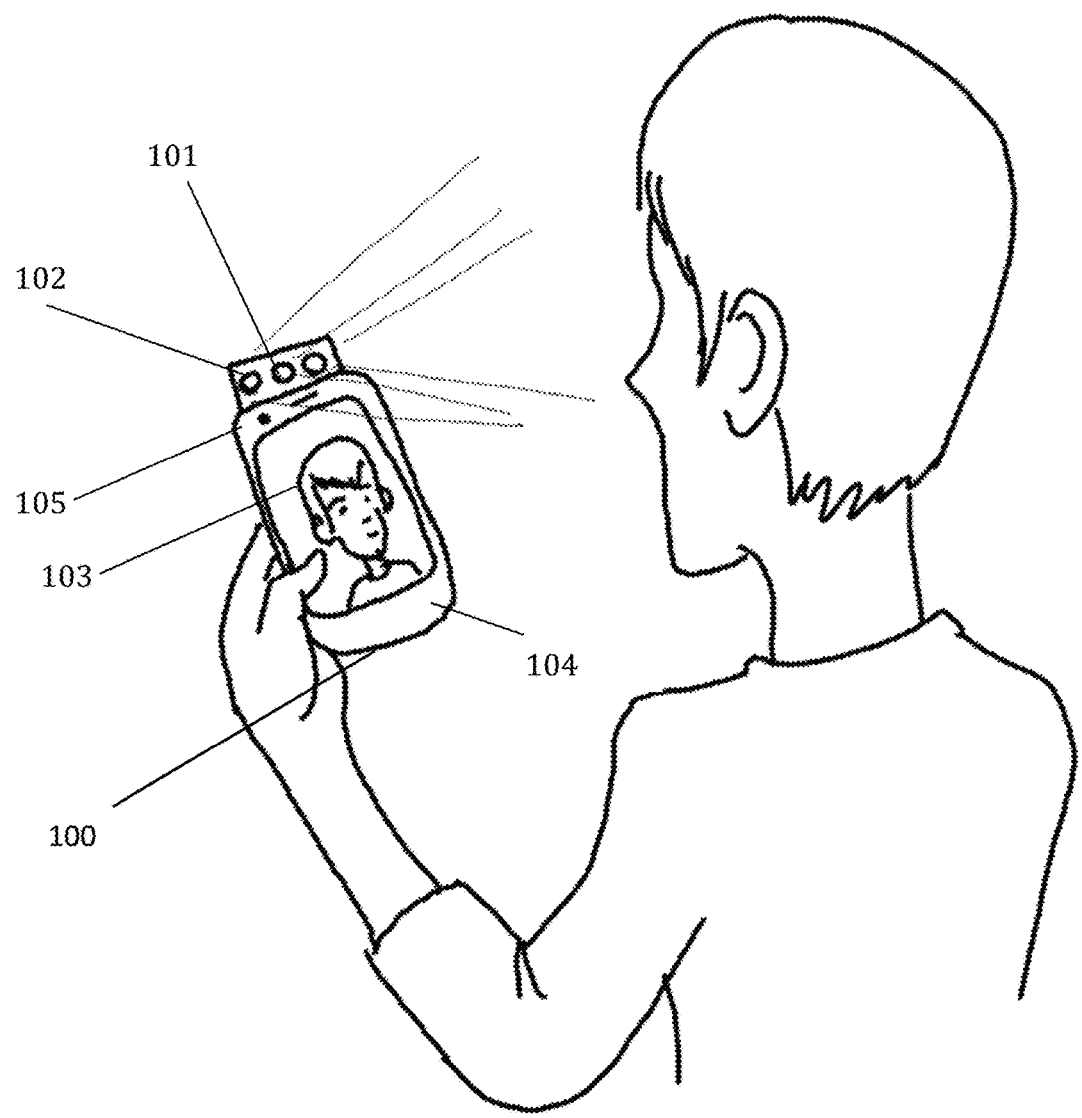
FIG. 1 illustrates an external lighting accessory with lighting sources attached to the top of the mobile device and facing the front to illuminate a user in a front field of view of a front camera.

Referring now to FIG. 1, an external lighting accessory 100 is shown attached to the top of a mobile digital camera device 104. The mobile digital camera device 104 may be a mobile phone, a smart phone, a tablet computer, or other mobile or portable electronic device with a built-in digital camera.

The mobile digital camera device 104 includes a front camera 105 to capture digital images 103 in the front field of view of the front camera 105. The mobile digital camera device 104 may include a rear camera (see rear camera 106 in FIG. 3A, for example) to capture digital images in the rear field of view of the rear camera.

The external lighting accessory 100 includes a plurality of lighting sources 101 in a light array 102 that is configured to face forward on the front of the device to illuminate a front side of a user. The external lighting accessory 100 provides front lighting to capture digital images 103 in the front field of view of the front camera 105.

The light sources 101 of the external lighting accessory 100 provide high intensity lighting by using light emitting diodes (LEDs), for example. Light diffusion covers (see light diffusion covers 954 in FIG. 9A) are mounted over the LEDs in order to illuminate the user for self-portraits or video conferencing/capture. The light diffusion covers and the LEDs are integrated together with a housing to form a light source 101 during their manufacture. The light diffusion covers soften the light emitted by the light sources 101 to avoid blinding a user with direct lighting. The soft lighting provided by the diffusion covers further diffuses the lighting to improve how the user appears in front of the camera 105. The soft lighting lowers the contrast and eliminates harsh shadows, thereby forming a smoother and softer looking face of the user in the images 103, typically associated with youth and beauty.

Figure 2A:
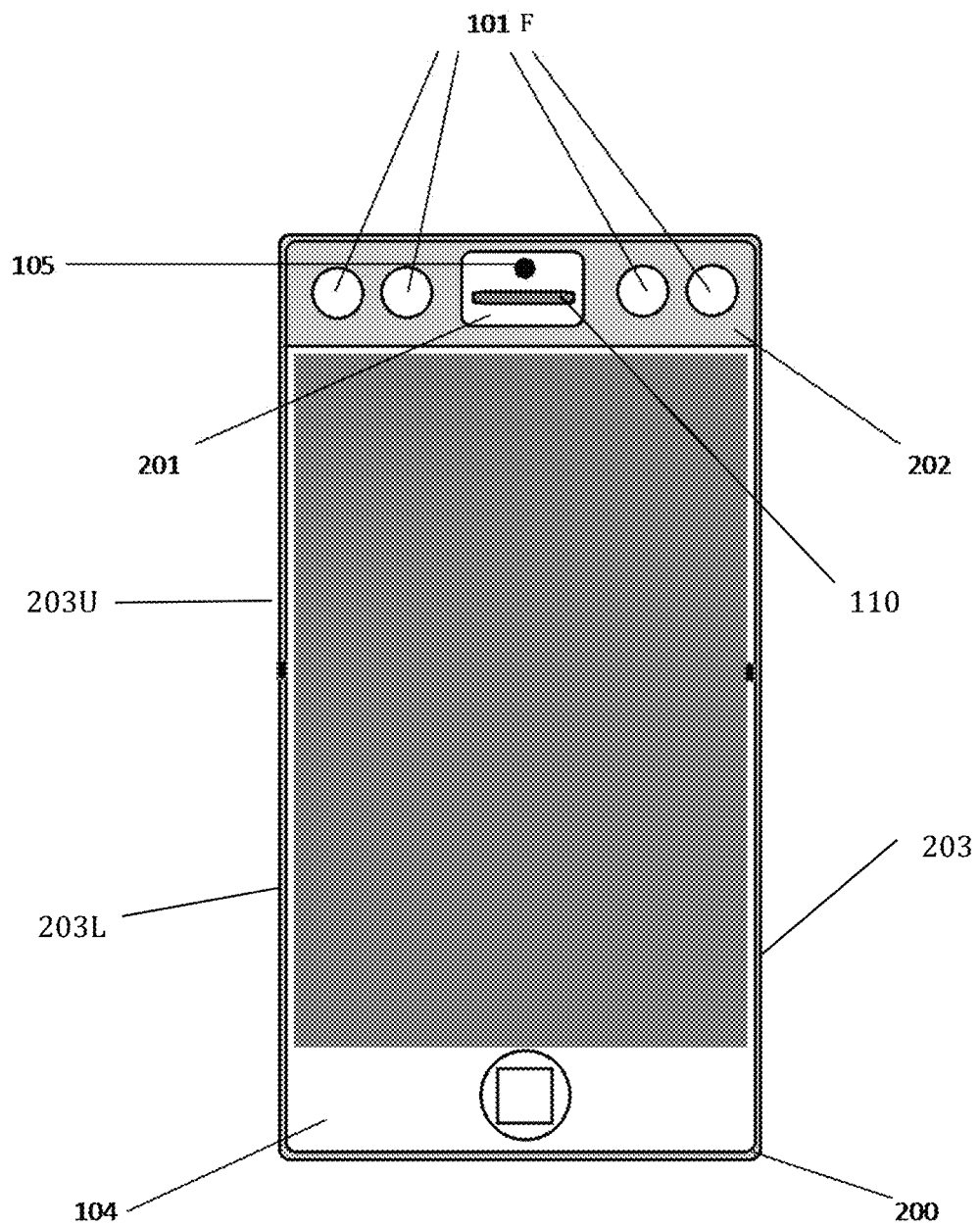
FIGS. 2A-2B illustrate an external lighting accessory which covers a small portion of a front bezel with the light sources directed to a front field of view.
Figure 2B:
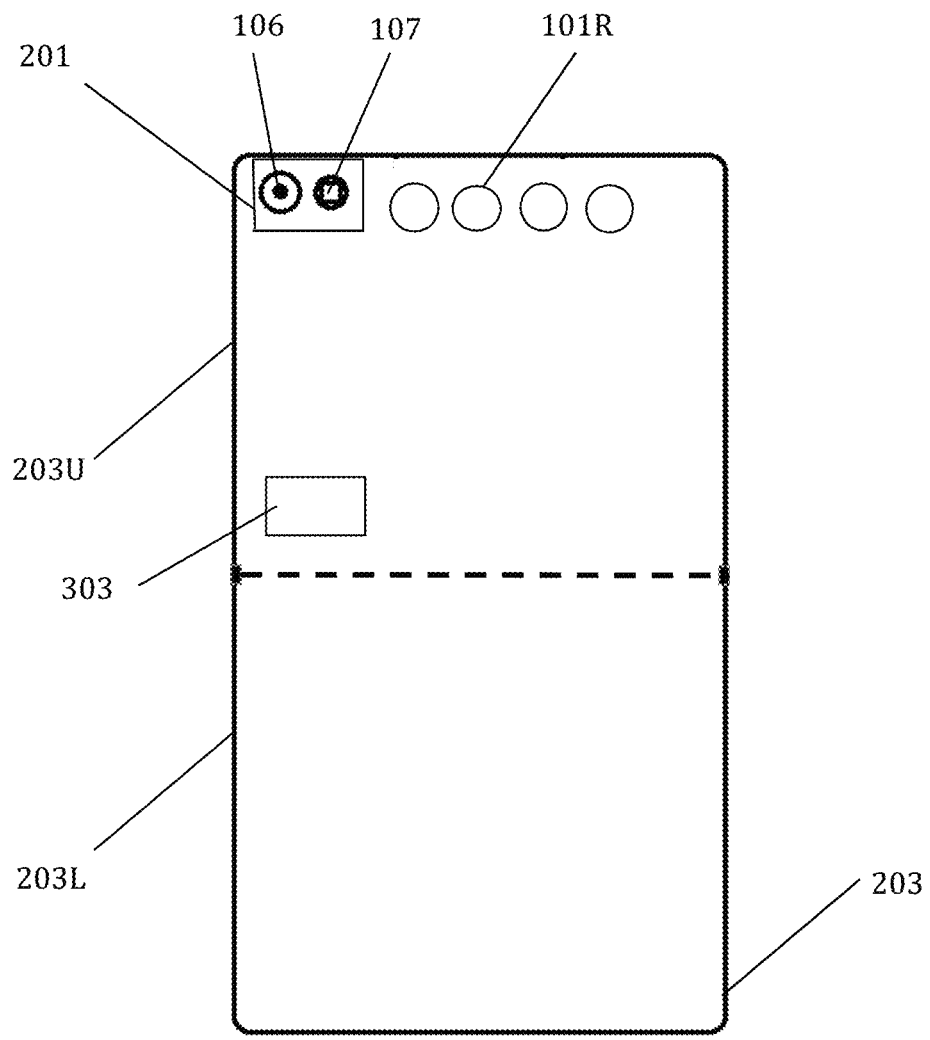

Referring now to FIGS. 2A-2B, an external lighting accessory 200 is shown coupled to the mobile digital camera device 104. The external lighting accessory 200 covers a small portion of the front bezel of the mobile digital camera device 104. The external lighting accessory 200 includes a front light array panel 202F with a plurality of light sources 101F mounted thereto. The plurality of light sources 101F face forward to direct light rays out from the front side of the external lighting accessory 200. A rear portion of a case housing 203 of the external light accessory 200 may include a plurality of light sources 101R that face rearward to direct light rays out from the back side of the external lighting accessory 200. The front light sources 101F and the rear light sources 101R may be instantiated by the same light source 101. The external light accessory 200 further includes one or more control buttons/switches 303 to selectively power ON/OFF the plurality of light sources 101F facing forward and/or the plurality of light sources 101R facing rearward. The one or more control buttons/switches may be mounted to the case housing in different locations as needed to avoid obstructing other features of the external light accessory 200 and/or mobile digital camera device 104.

The case housing 203 of the external lighting accessory 200 may slip onto the mobile digital camera device 104 like a slipper and provide a friction fit to clamp onto the device 104. The cash housing 203 may have an upper housing portion 203U and a lower housing portion 203L that couple together to clamp onto the device 104 as is shown in FIGS. 2A-2B. Electrical connections may be made by a ribbon cable or by connectors to couple batteries in the lower housing portion 203L to the light sources in the light array and lighting control device in the upper housing portion 203U.

The case housing 203 of the external lighting accessory 200 includes one or more openings to support the functionality of the mobile digital camera device. An upper opening 201 in the light array panel 202 exposes the camera 105 and a speaker 110 of the mobile digital camera device 104. The external lighting accessory 200 may have a lower bezel with a lower opening that exposes a control button of the mobile digital camera device 104. In any case, the external lighting accessory 200 has a large opening that exposes the display device of the mobile digital camera device 104. Other openings in the external lighting accessory 200 may be provided, such as in its left, right, and back sides to expose and provide user access to other features of the mobile digital camera device 104, such as a rear camera, stereo sound speakers, and control buttons for example. In this manner, the functionality of the mobile digital camera device 104 is unobstructed by the external lighting accessory 200.

Referring now to FIG. 2B, a back side of the external lighting accessory 200 is shown The mobile digital camera device 104 is mounted in the external lighting accessory 200. The external light accessory further includes one or more control buttons/switches 303 to selectively power ON/OFF the plurality of light sources 101R facing rearward. Opening 201 is visible on the rear of the external lighting accessory 203 to allow for the normal functionality of the features of the mobile digital camera device 104 such as the rear facing camera 106 and the rear facing flash 107.

Referring now to FIGS. 3A-3D, multiple views are shown of the external lighting accessory case 300 mounted to the mobile digital camera device 104. The external lighting accessory case 300 includes a light array panel 304 including a plurality of lights sources 101. The light array panel 304 is pivotally coupled to the case housing 203 by a hinge 306. The light array panel can swivel over an angle of about one hundred eighty (180) degrees or more. This allows the light array panel to pivot from the front side of the case and mobile device to the rear side of the case and mobile device. With the light array panel 304 being able to swivel between front and back sides, the external lighting accessory has the ability to respectively light the front field of view for the front camera or the rear field of view for the rear camera of the mobile device. In a front facing position, the light array panel 304 is used to light up the scene for the front camera 105. In a rear facing position, the light array panel 304 is used to light up the scene for the rear camera 106.

The external lighting accessory case 300 can also be used to improve the rear lighting available for a rear camera 106 of the mobile digital camera device 104. The flash lighting provided by a rear camera flash 107 is usually weak. Typically, the rear flash lighting in a mobile digital camera device comprises only one or two compact LEDs. This is usually due to space constraints of a compact design for the mobile digital camera device and the requirements of low power consumption in a battery powered mobile digital camera device.

Figure 3A:
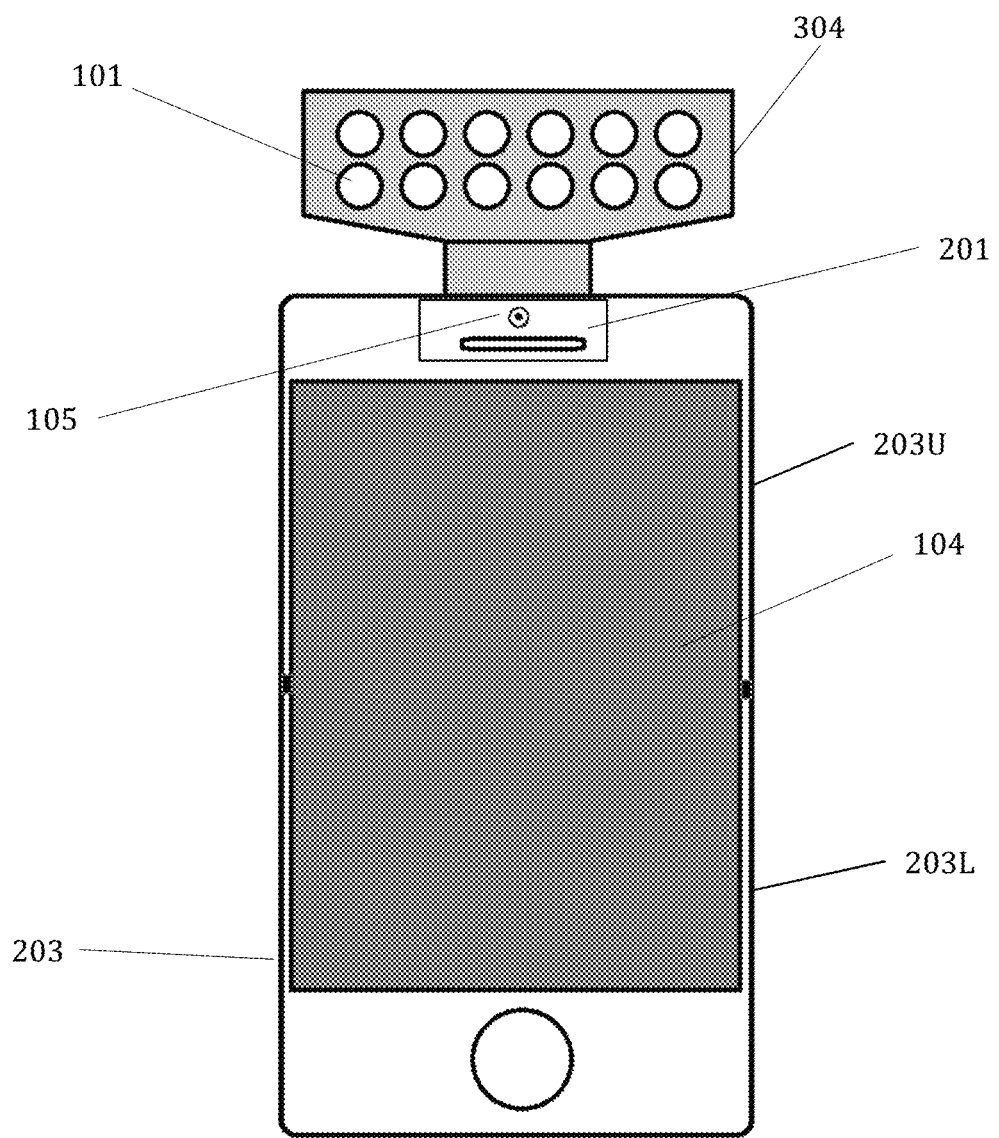
FIGS. 3A-3D illustrate multiple views of an external lighting accessory case with an adjustable array of lights to selectively illuminate a front field of view or scene and a rear field of view or scene.
Figure 3B:
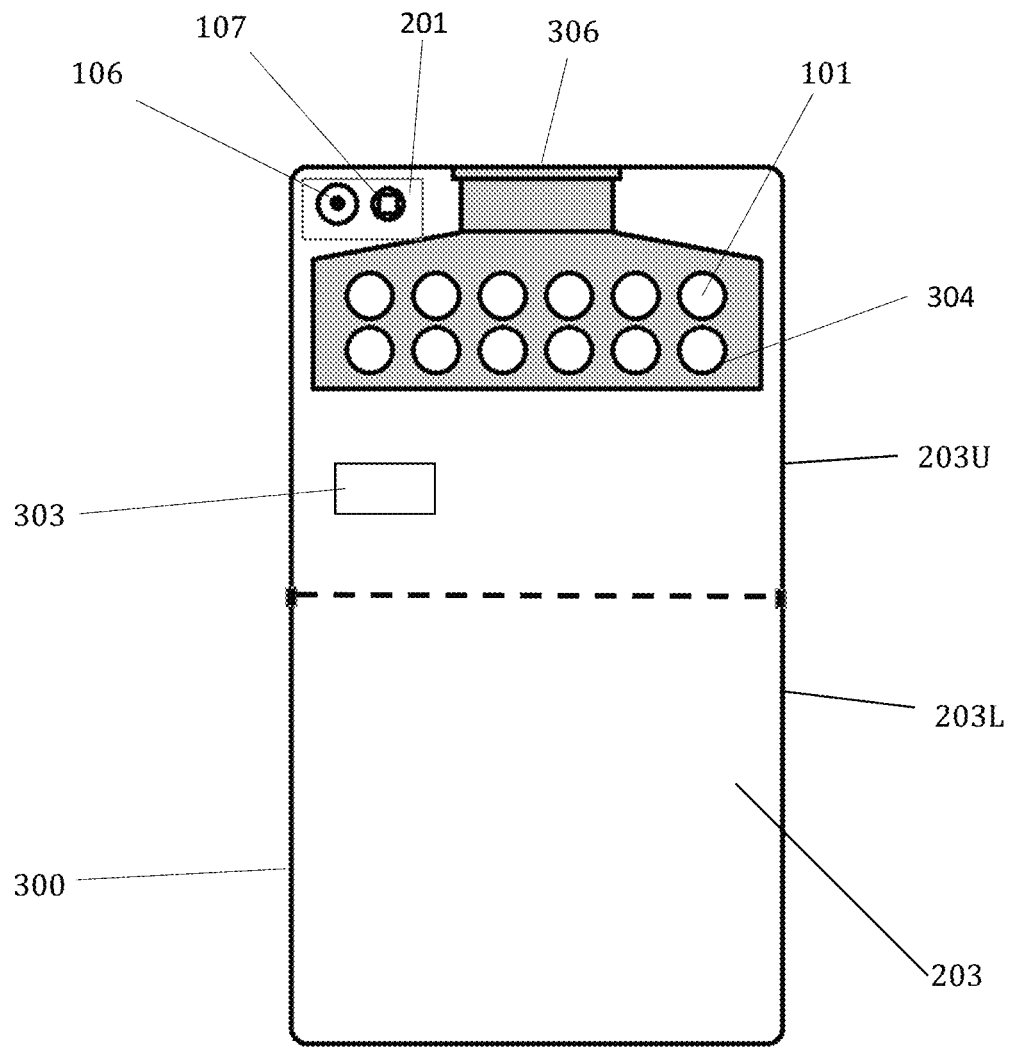

FIG. 3B shows the rear of the external lighting accessory case 300 mounted to the mobile digital camera device 104. The external lighting accessory case 300 includes the light array panel 304 and a case housing 203. The case housing 203 may be a hard plastic or polypropylene shell that is designed to clamp onto a portion of the mobile digital camera device 104. The case housing 203 may alternatively be formed of a soft injection molded silicone that is flexible and can slip over, onto, and around a portion of the mobile digital camera device 104.

The case housing 203 of the external lighting accessory case 300 may slip onto the mobile digital camera device 104 like a slipper and provide a friction fit to clamp onto the device 104. Alternatively, the cash housing 203 may have an upper housing portion 203U and a lower housing portion 203L that couple together to clamp onto the device 104 as is shown in FIGS. 3A-3B. Electrical connections may be made by a ribbon cable or by connectors to couple batteries in the lower housing portion 203L to the light sources in the light array and lighting control device in the upper housing portion 203U.

The light array panel 304 includes a plurality of lights sources 101. The light array panel 304 shown in FIG. 3A is in a stored position with the light sources facing the rear field of view to provide lighting for the rear facing camera 106. The rear facing camera 106 and the rear facing flash 107 are visible through an opening 201 in the case housing of the external lighting accessory case 300. Other openings are provided in the case housing to allow other features of the mobile digital camera device to continue to be usable with their functions unobstructed by the external lighting accessory case 300.

The external lighting accessory case 300 further includes a rear mounted button 303 that is used to control the lighting levels provided by light sources 101 of the external lighting accessory 300. The rear mounted button 303 can be repeatedly pressed to turn on one or more of the plurality of light sources to vary the light intensity and to finally turn all off.

Optionally, the external lighting accessory case 300 further includes a wireless or Bluetooth radio (see radio 950 in FIG. 9B) to form a wireless communication connection to the mobile digital device 104 to provide a wireless control interface for the button 303. The mobile digital device 104 can be loaded and execute accompanying mobile device software to control the light sources 101 of the external lighting accessory case 300 to turn on one or more of the plurality of light sources to vary the light intensity.

Optionally, the external lighting accessory case 300 may further include an embedded processor (see processor 940 in FIG. 9B). The button 303 and/or its wireless control interface can be used to control the embedded processor to control the amount of current being delivered to the one or more of LEDs of the light sources to vary the light intensity.

FIG. 3A illustrates a front view of the external lighting accessory case 300 mounted to the mobile digital camera device 104. The light array panel 304 with its plurality of lights sources 101 is pivoted so that it is a raised forward facing position. In this forward facing position, the light array panel provides lighting for a front point of view with respect to the front side of the mobile digital camera device 104. In this position, the light array panel 304 with its light sources 101 provides diffused lighting to illuminate the front of a user for capture by the front facing camera 105 of the mobile digital camera device. Opening 201 is visible on the front of the external lighting accessory case 300 to allow for the normal functionality of the features of the mobile digital camera device 104 such as the front facing camera 105 and the speaker.

Figure 3C:
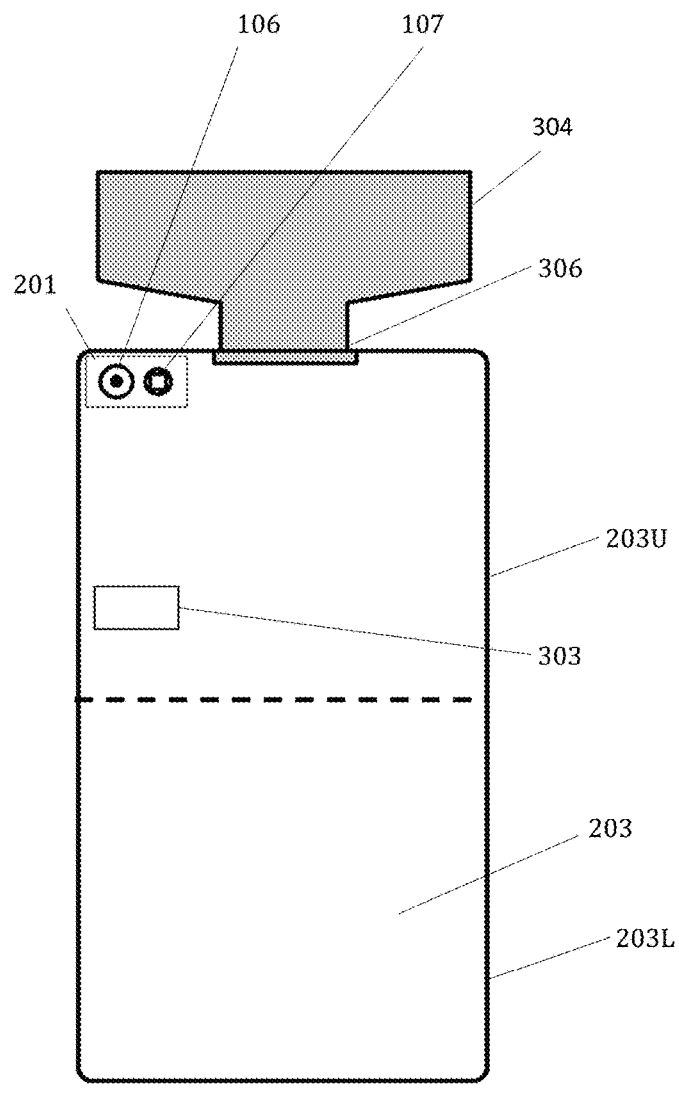

FIG. 3C illustrates the rear of the external lighting case 300 with the light array panel 304 in the raised forward facing position. In this position of the light array panel 304, the rear facing camera 106, the rear facing flash 107 and the external button 303 are unobstructed by the light array panel 304. Accordingly, the features of the mobile digital camera device 104 and external lighting case 300 continue to be usable for their respective functions, despite the position of the light array panel 304.

Figure 3D:
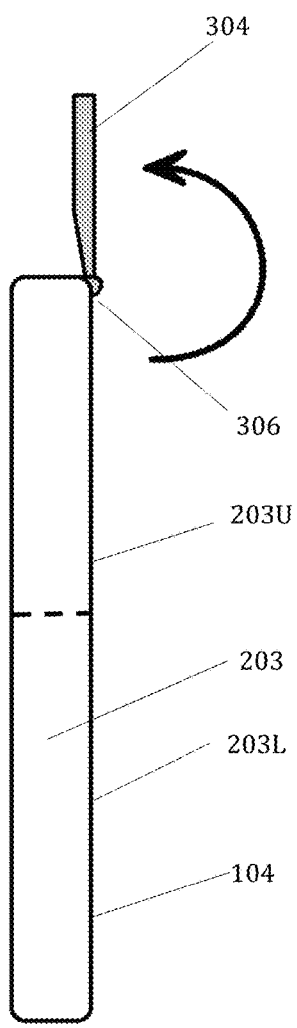

FIG. 3D illustrates a side view of the external lighting case 300. FIG. 3D better illustrates the hinge 306 and how the light array panel 304 is pivotally coupled to the case housing. From the stored position, the light array panel 304 can swivel upward about the hinge 306 to the raised forward facing position as is shown. The light array panel 304 in this position is approximately parallel with the front face or front side of the mobile digital camera device 104.

External Lighting Accessory Attachable Lamp

Figure 4:
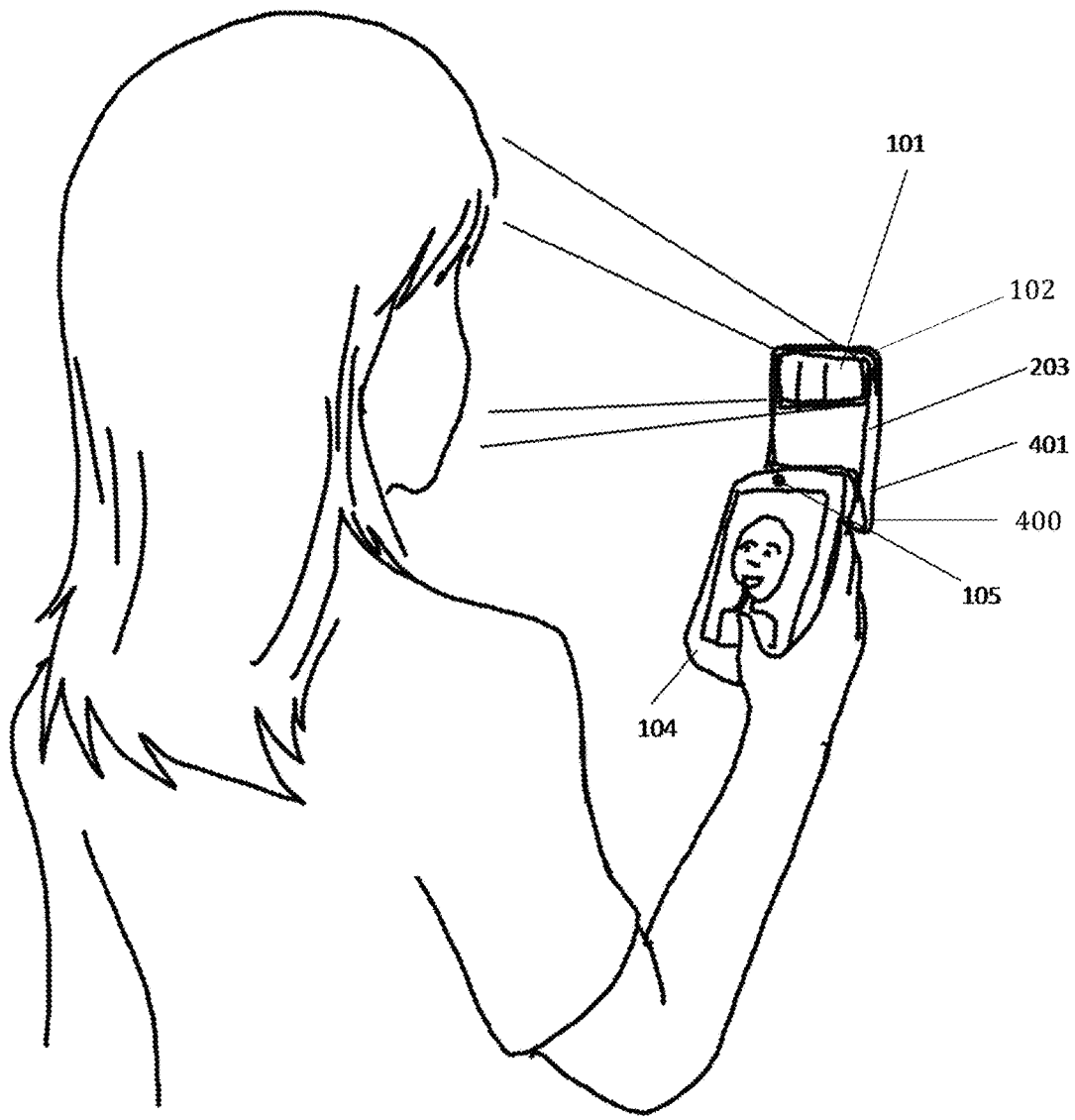
FIG. 4 illustrates an external lighting accessory case with an array of lights extended above and behind the mobile device to illuminate a user in the front field of view or scene.

FIG. 4 illustrates an external lighting accessory 400 being attachable by a mounting bracket 401 to the mobile digital camera device 104. The external lighting accessory 400 includes a housing, the mounting bracket 401, and the light array 102 comprising a plurality of light sources 101. FIG. 4 shows light rays emanating out of the light sources into a front field of view of the mobile digital camera device 104. The external lighting accessory 400 further includes one or more elements of the external lighting accessory case 300 that are not repeated here for brevity.

The mobile digital camera device 104 often has a lot of space constraints. The external lighting accessory 400 has fewer space constraints than that of the mobile digital camera device 104. Moreover, like the other external lighting accessories and cases disclosed herein, the external lighting accessory 400 has its own battery dedicated to provide lighting to the light array 102. The external lighting accessory 400 avoids using the internal battery of the mobile digital camera device 104. Accordingly, the external lighting accessory 400 avoids discharging the internal rechargeable battery of the mobile digital camera device when the camera 105 is utilized. With the external lighting accessory 400 having its own rechargeable battery and fewer space constraints, the lighting brightness of the external lighting accessory 400 can be magnitudes greater than the brightness of the built-in lighting that may be supplied by the mobile digital camera device.

Figure 5:
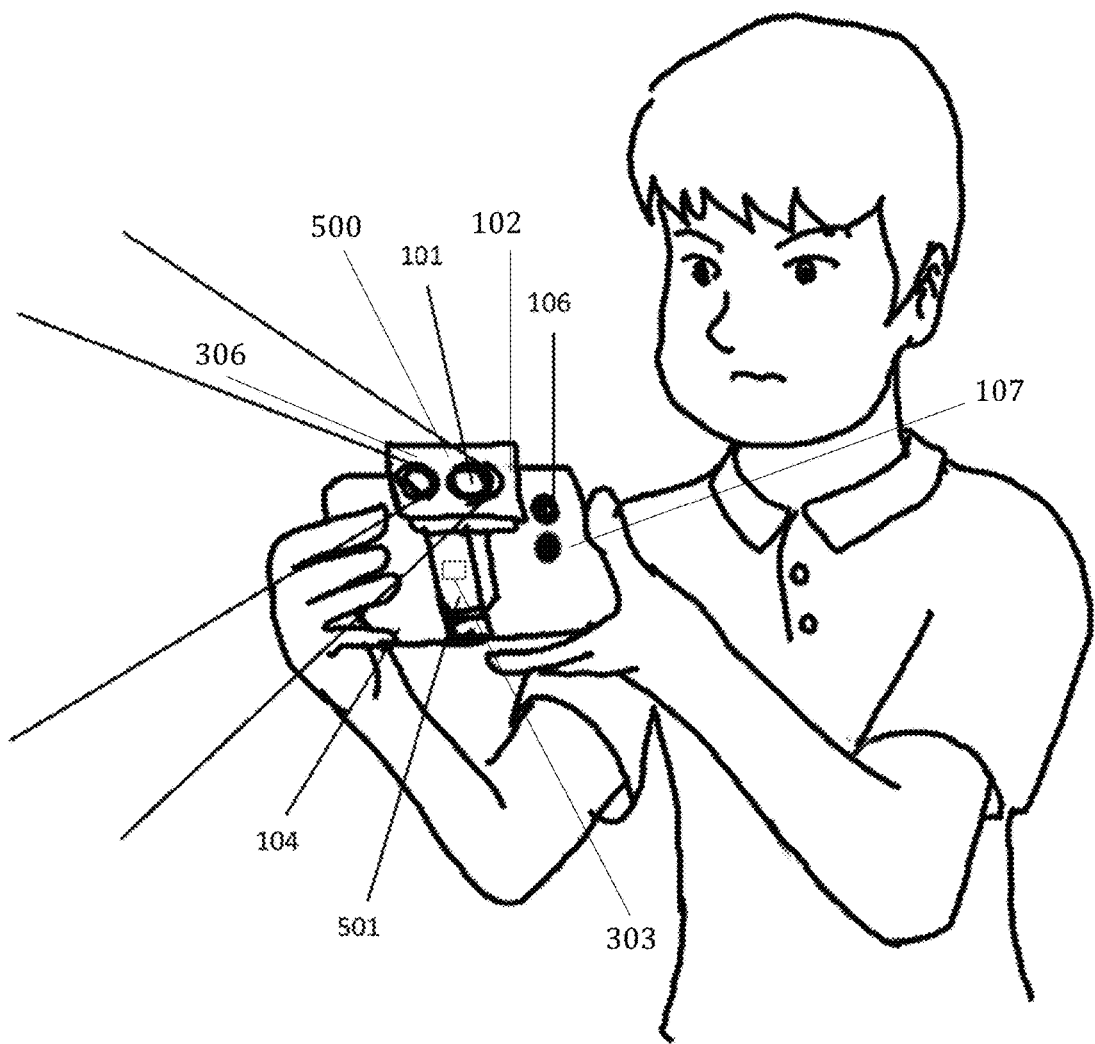
FIG. 5 illustrates an external lighting accessory attached to a mobile digital camera device with a clamp.

Referring now to FIG. 5, an external lighting accessory 500 is shown that is a small add-on attachment for a mobile digital camera device 104, such as a small form factor tablet or large smart phone for example. The external lighting accessory 500 includes an attachment device (clamp) 501, a housing, and an array of light sources (light array) 102 with the light sources 101. FIG. 5 shows light rays emanating out of the light sources into a rear field of view of the mobile digital camera device 104.

The clamp 501 attaches the external lighting accessory 500 to the back of the mobile digital camera device 104. The clamp 501 allows a user to attach the external lighting accessory 500 to the mobile digital camera device 104 when additional lighting is needed. It further allows the user to remove or detach the external lighting accessory 500 from the mobile digital camera device 104 when additional lighting is not needed. The external lighting accessory 500 further includes one or more elements of the external lighting accessory case 300 that are not repeated here for brevity.

The external lighting accessory 500 may further include one or more hinges 306 to pivotally couple the light array 102 to its housing. With the one or more hinges 306, the light array and its light sources 101 may pivot upward from a rear facing position, as shown, to a front facing position. In this manner, the external lighting accessory 500 can also be used to provide lighting to the front facing camera 105 of the mobile digital camera device in the front field of view when in the front facing position. Alternatively, the external lighting accessory 500 can be used to provide lighting to the rear facing camera 106 of the mobile digital camera device when in the rear facing position. In this mounting configuration, the rear facing camera 106 and the rear facing flash 107 of the mobile digital camera device 104 and the rear mounted button 303 of the external lighting accessory 500, continue to be usable for their functions without being obstructed by the different positions of the light array 102.

External Lighting Accessory Attachable Case

Figure 6:
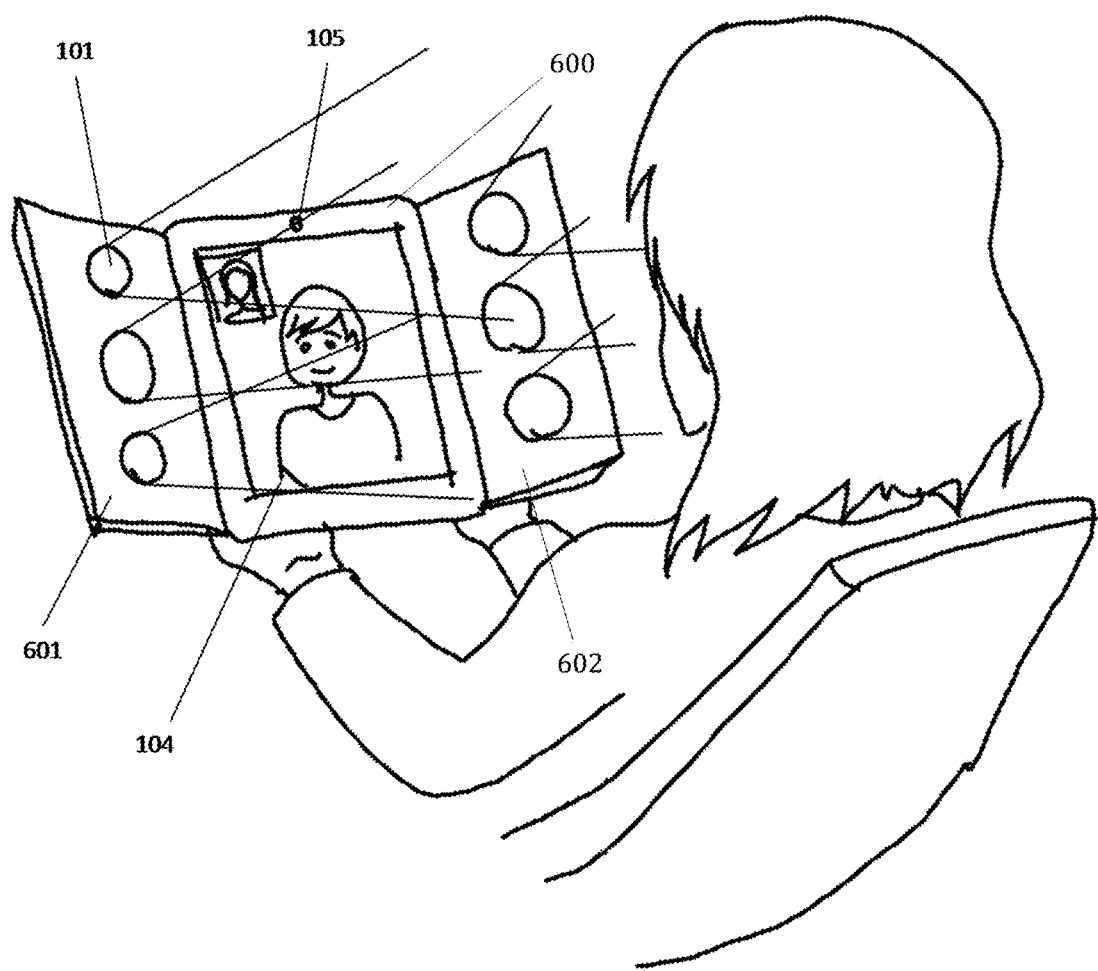
FIG. 6 illustrates an external lighting accessory with hinged lighting array panels that cover over the mobile device display screen in a closed position and open outward to each side into an open position to evenly illuminate a user.

Referring now to FIG. 6, an external lighting accessory case 600 for a mobile digital camera device 104 is shown. The external lighting accessory case 600 encloses a mobile digital camera device 104, such as a computer tablet or a large smart phone. The external lighting accessory case 600 includes a pair of hinged lighting arrays 601,602. Each of the hinged lighting arrays 601,602 includes a plurality of light sources 101. FIG. 6 shows light rays emanating out of the light sources into a front field of view of the mobile digital camera device 104.

The plurality of light sources 101 in the pair of hinged lighting arrays 601,602 of the external lighting accessory 600 can selectively provide extra lighting for the front camera 105 of the mobile digital camera device 104. The pair of hinged lighting arrays 601,602 of the external lighting accessory 600 can further provide enhanced mechanical protection by pivoted and closed over the display device of the mobile digital camera device 104.

FIGS. 7A-7D illustrate various view of an external lighting accessory case 700 mounted to the mobile digital camera device 104. The external lighting accessory case 700 includes two hinged light array panels 301-302 that pivot from opposing sides of the case housing. The external lighting accessory case 700 further includes one or more elements of the external lighting accessory case 300 that are not repeated here for brevity.

Figure 7A:
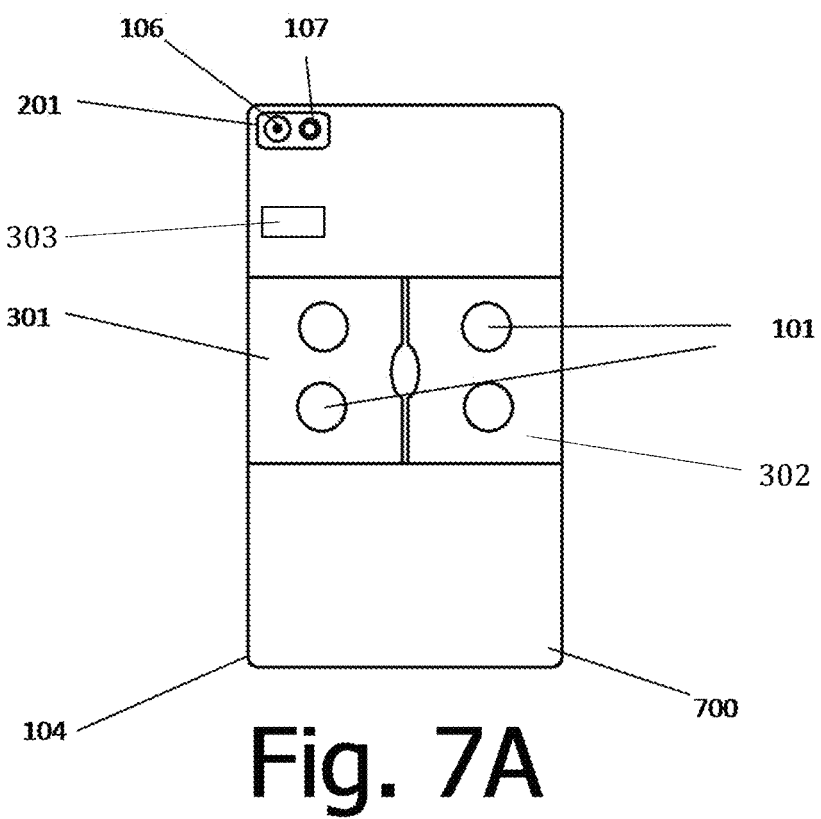
FIGS. 7A-7D illustrate multiple views of an external lighting accessory case.

Referring now to FIG. 7A, a rear view of the external lighting accessory case 700 is shown. The external lighting accessory case 700 encloses the mobile digital camera device 104 to protect it and provide additional lighting. Each of the hinged light array panels 301-302 include a plurality of light sources 101. In FIG. 7A, the hinged light array panels 301-302 are shown stored inside a recessed cavity 701 (see FIG. 7C) in the rear side of the external lighting accessory case 700. In this stored position, the plurality of light sources 101 of the hinged light array panels 301-302 are used to illuminate the rear field of view or rear scene for the rear facing camera 106 of the mobile digital camera device 104. In this stored position, the plurality of light sources 101 of the hinged light array panels 301-302 can compliment the available lighting from the rear facing flash 107 of the mobile digital camera device 104. The button 303 of the external lighting accessory case 700 controls the light level or light intensity provided by the light sources 101 in the lighting arrays 301-302.

Figure 7B:
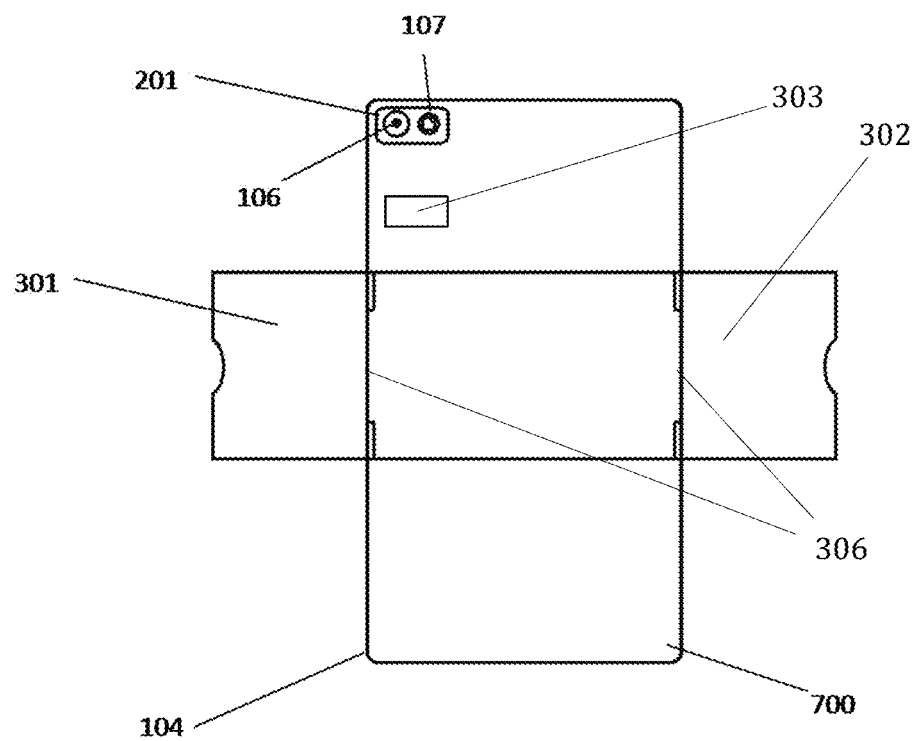

Referring now to FIG. 7B, the rear view of the external lighting accessory case 700 is shown with the hinged light array panels 301,302 opened outwards into an open or deployed position. The external lighting accessory case 700 includes hinges 306 coupled to and between opposing sides of the case housing and the hinged light array panels 301,302. In the open position, the hinged light array panels 301,302 point towards the front field of view to provide a lighting source for the front facing camera 105 of the mobile digital camera device 104. Typically, the mobile digital camera device 104 does not include any lighting device for the front facing camera 105 and its front field of view or scene. With the hinged light array panels 301,302 in the open or deployed position, the rear facing camera 106 and the rear facing flash 107 are not impeded from normal functionality.

Figure 7C:
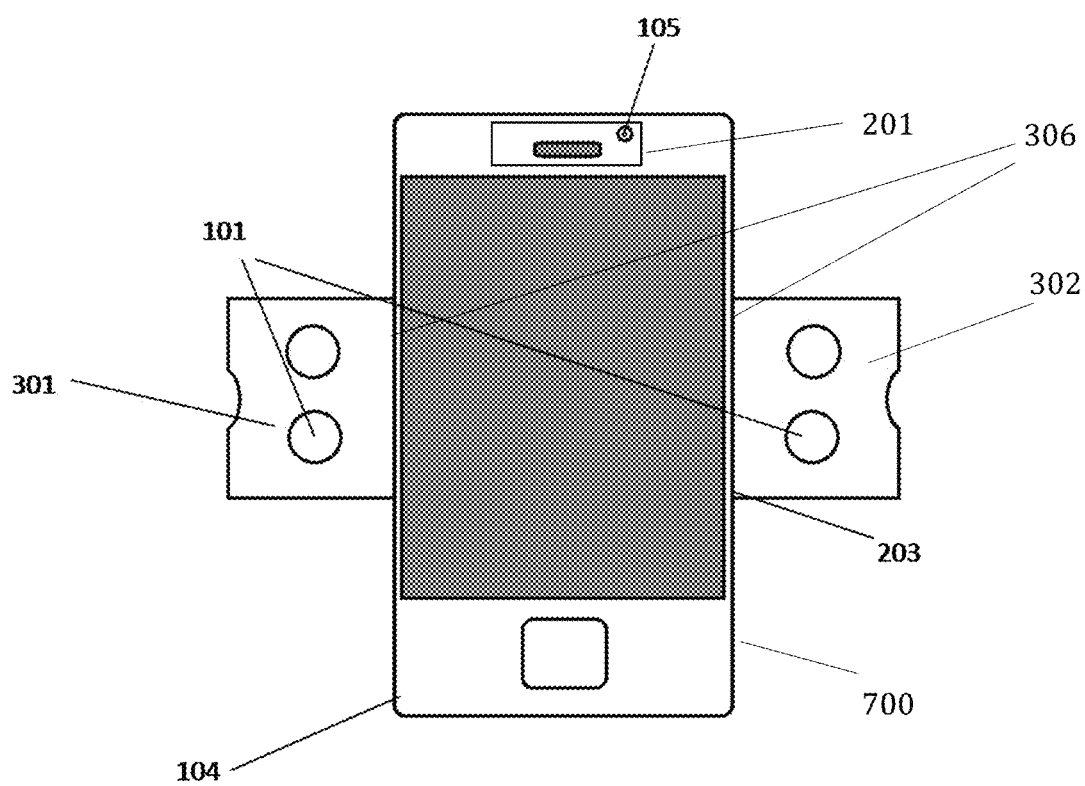

Referring now to FIG. 7C, a front view of the external lighting accessory case 700 is shown with the hinged light array panels 301, 302 in the open or deployed position opened outwards 180 degrees on hinges 306 to point the light array panels 301, 302 towards the front to provide a lighting source 101 for the front facing camera 105. Opening 201 is visible on the front of the external lighting accessory case 700 to allow for the normal functionality of the features of the mobile digital camera device 104 such as the front facing camera 105 and the speaker.

Figure 7D:
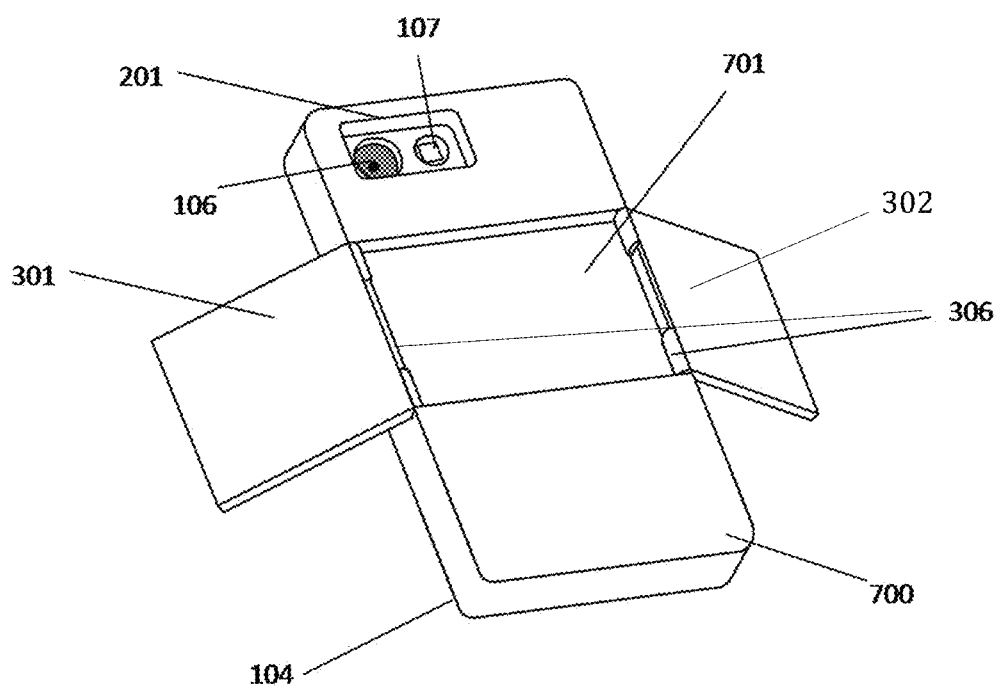

Referring now to FIG. 7D, an isometric view from the rear of the external lighting accessory case 700 is shown with the hinged light array panels 301,302 in an open or deployed position. The light array panels 301,302 can pivot over 180 degrees on the hinges 306 from the stored position into the open or deployed position. In FIG. 7D, the recessed cavity 701 for storing the hinged light array panels 301,302 is better shown. The hinged light array panels 301,302 pivot into the recessed cavity 701 of the case housing when being closed into the stored position.

One or more openings 201 in the external lighting accessory case 700 allow user access to the controllable features of the mobile digital camera device 104. The one or more openings 201 further avoid obscuring function features of the mobile digital camera device 104 such as rear facing camera 106 and rear facing flash 107. Moreover, the hinged light array panels 301,302 do not obscure the button 303 of the external lighting accessory case 700 or the functional/controllable features of the mobile digital camera device 104 in the open or stored positions.

Figure 8A:
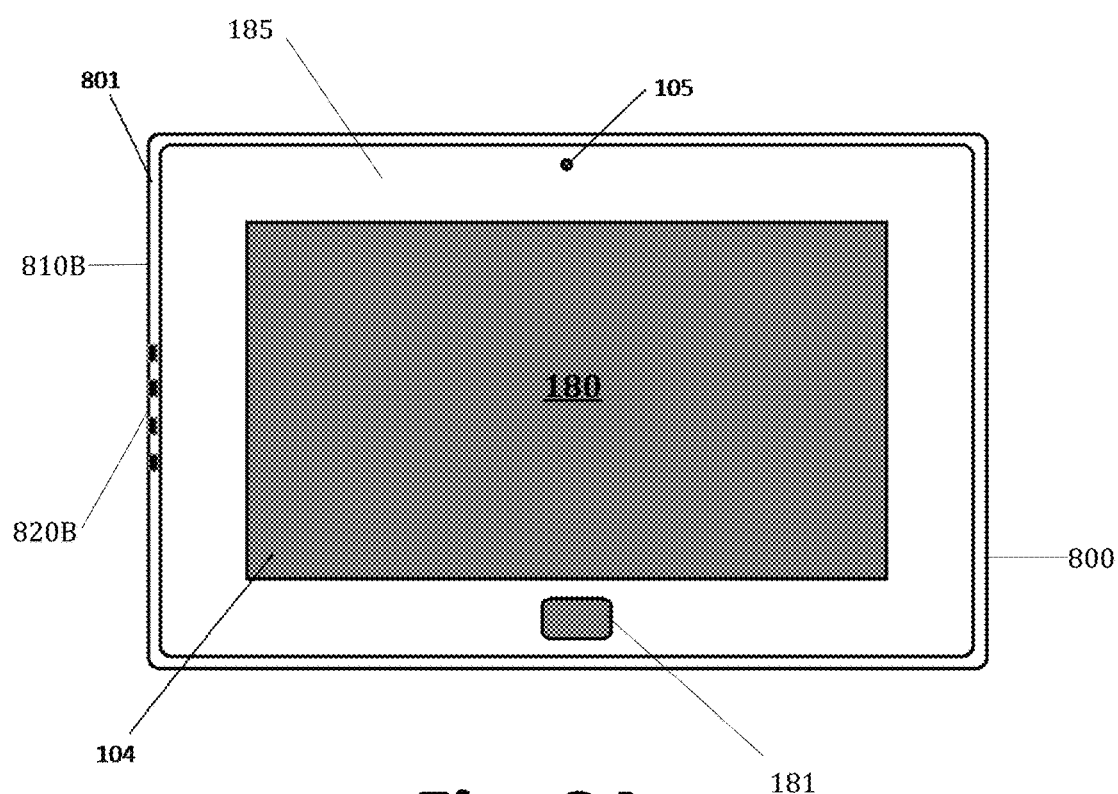
FIGS. 8A-8B illustrate views of an external lighting accessory case.
Figure 8B:
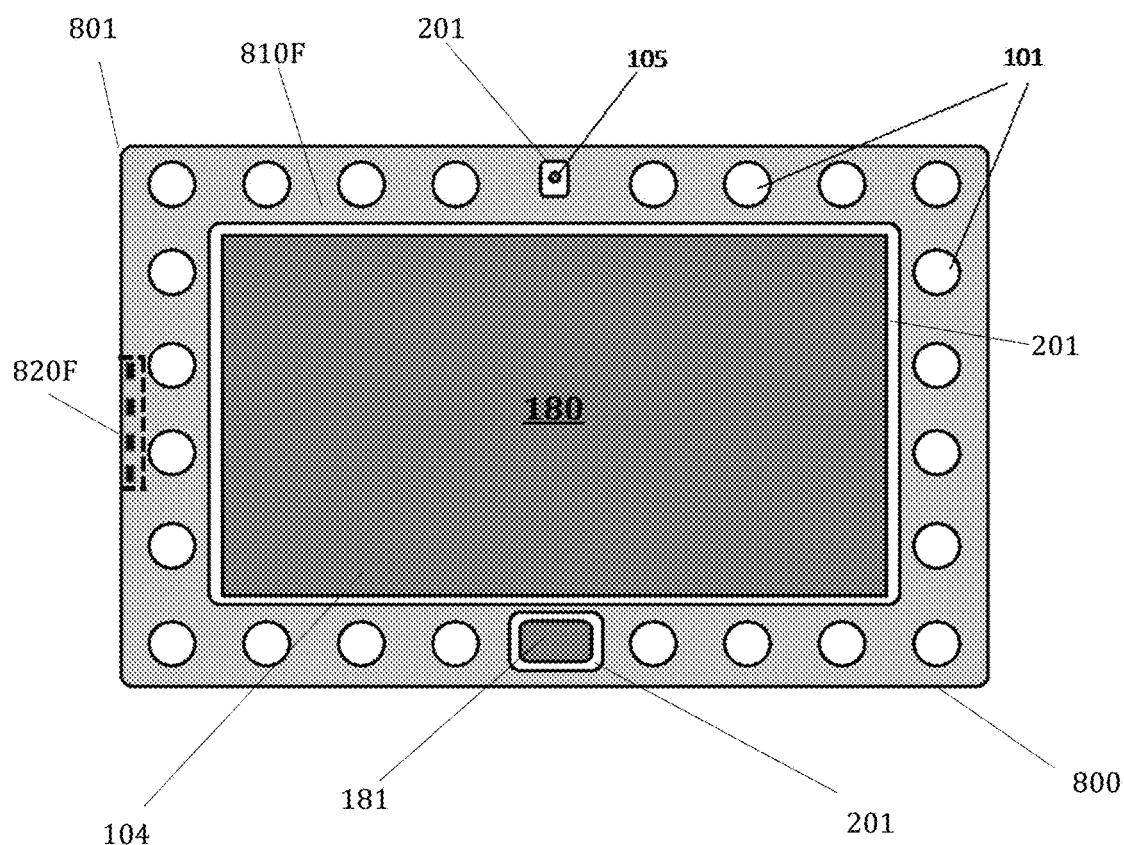

Referring now to FIGS. 8A-8B, an external lighting accessory case 800 for a mobile digital camera device 104 is shown. Some mobile digital camera devices have a bezel 185 around their display device 180. Typically the area of the bezel 185 provides little user interface, but for a camera 105 and a home button 181. Accordingly, the bezel 185 may be an area of the device over which a rectangular bezel 810F with its plurality of light sources 101 can mount over. For a compact form factor, the space in the bezel 185 of the mobile digital camera device 104 can be used to mount the external lighting accessory case 800.

As shown in FIG. 8B, the external lighting accessory case 800 encloses/embraces the mobile digital camera device 104, such as a computer tablet or a large smart phone. The external lighting accessory case 800 includes a case housing 815 with a back case portion 810B shown in FIG. 8A and a front rectangular bezel 810F shown in FIG. 8B. The case housing 801 may be a sleeve with an open/closeable end into which the device 104 may be inserted. The case housing 801 may be a clamshell case with the bezel 810F pivotally coupled to the back case portion 810B by one or more hinges. Alternatively, the bezel 810F may be couple to the back case portion 810B with a fastener or clip to form the case housing 801 about the device 104.

A plurality of light sources 101 are mounted into one or more sides of the bezel 810F. In one embodiment, the light sources 101 are mounted into opposing sides of the front rectangular bezel 810F. In another embodiment, the light sources 101 are mounted into all sides of the front rectangular bezel 810F. One or more batteries and a button/switch (see FIG. 9B for example) to control the power to the light sources 101 are mounted in the back case portion 810B of the case housing 815. Accordingly, the back case portion 810B has one or more connectors 820B shown in FIG. 8A and the front rectangular bezel 810F has one or more connectors 820F shown in FIG. 8B. The connectors 820B, 820F can physically mate together to electrically couple the light sources 101 in the front rectangular bezel to the button and batteries in the back case portion. Alternatively, a ribbon cable (See FIG. 9B) may be used to electrically couple the light sources 101 in the front rectangular bezel to the button and batteries in the back case portion of the external lighting accessory case 800.

The external lighting accessory case 800 includes one or more openings 201 in the case housing to allow user access to features of the mobile digital camera device 104 such as front facing camera 105, the display device 180, speakers, and buttons 181 so their functionality is unobstructed by the external lighting accessory case 800. The front bezel 810F of the case housing 815 surrounds an opening 210 to expose the display device 180 of the mobile digital camera device 104 to the user.

Electronics of External Lighting Accessories/Cases

Referring now to FIG. 9A, a light source 101 is shown in greater detail. The light source includes a housing 960, one or more LEDs 952, and an optical element 954 mounted over the one or more LEDs 952. The optical element and the one or more LEDs are integrated together with the housing 960 to form the light source 101. A pair of electrical terminals 956-957 are coupled to the one or more LEDs 952 to which electrical connections can be made to power on/off each light source together or individually.

In one embodiment, the optical element 954 is a light diffusion cover to soften light generated by the one or more light emitting diodes 952. In another embodiment, the optical element 954 is a diffusion lens to direct and soften the light generated by the one or more light emitting diodes. The inner surface of the housing 960 may be coated with a reflective material, such as aluminum for example, to reflect light out through the optical element 954.

Referring to FIG. 9B, a schematic wiring diagram of the external lighting accessories is shown with the mechanical components and case housing being ghosted out. The schematic wiring diagram represents an example of the electrical components of external lighting accessories shown and described herein. Externally, the electronics of an external lighting accessory includes a light control device 903 (e.g., on and off button/switch 303), a light array panel 304 with a plurality of light sources 101, and a charging connector 905. Internally, the electronics of an external lighting accessory further includes electrical wires 901, one or more ribbon wire cables 908, resistors 902, and a battery or one or more batteries 904. The electronics may be coupled together as shown in FIG. 9B.

The light control device 903 may be an instance of on and off button/switch 303. The control device can variably control the light intensity of the light provided by the light array. If light control device 903 is a button, the button can be repeatedly depressed to sequence through a plurality of different light intensities in one embodiment. In another embodiment, the button can be pressed once and held for a period of time to increase or decrease the intensity from an initial light intensity. If the light control device 903 is a simple on/off push button switch, the switch may simply turn the light sources on and off between full light intensity and zero light intensity.

In other embodiment, the light control device 903 may be controlled by other means, such as the hinged light arrays for example. In one embodiment, the light control device 903 is a spring loaded momentary open push button switch that is controlled by the position of a hinged light array. When the hinged light array is in the closed/stored position, it presses on the spring-loaded momentary open push button switch to open the circuit and prohibit current flow to the light sources in the hinged light array. When the hinged light array is pivoted out into an open position, the spring loaded momentary open push button switch closes such that the circuit is completed to allow current flow to the light sources. In another embodiment, the light control device 903 is a rotary switch concentric with the hinge with one side coupled to the case housing and the opposite side coupled to the hinged light array. When the hinged light array is in the closed/ stored position, the rotary switch opens the circuit and prohibits current flow to the light sources in the hinged light array. When the hinged light array is pivoted out into an open position, the rotary switch closes the circuit to allow current flow to the light sources. Accordingly, the light control device 903 can variably control the light intensity of the light provided by the light sources in response to the pivoting of the one or more hinged light arrays about the case housing. In another embodiment, the light control device 903 may one or more active transistor circuits under control of a processor to vary the light intensity.

Optionally, the external lighting accessory case may further include a wireless or Bluetooth radio 950 and processor 940. The radio 950 can form a wireless communication connection to the mobile digital device 104 to provide a wireless control interface for the button 303. The mobile digital device 104 can be loaded and execute accompanying mobile device software to control the light sources 101 of the external lighting accessory to turn on one or more of the plurality of light sources to vary the light intensity. The mobile device software instructional commands can instruct the processor 940 to further control the electrical components of the external lighting accessory case including the light intensity provided by the one or more light sources 101.

The one or more batteries 904 selectively supply power to the plurality of light sources 101 mounted in light array 304 under the control of the on and off button/switch 903. The one or more batteries 904 are rechargeable batteries. The one or more batteries 904 may be standard Lithium-ion rechargeable batteries, for example, that are commonly used in mobile devices.

All of the external lighting accessories and external lighting accessory cases disclosed herein, have their own source of energy provided by the one or more batteries 904 that is dedicated to provide lighting to their respective light arrays and light sources. This avoids using energy from the internal battery of the mobile digital camera device 104. Accordingly, the external lighting accessories and cases avoid discharging the internal rechargeable battery of the mobile digital camera device when their cameras are utilized with the light arrays and light sources. Moreover, the external lighting accessories and cases have fewer space constraints. Accordingly, the lighting brightness provided by the respective light arrays and light sources of the external lighting accessories and cases can be magnitudes greater in brightness or provided for a longer period of time than typically supplied by the built-in lighting of the mobile digital camera device.

The one or more ribbon wire cables 908 are used to flexibly route power from the one or more over the hinges to the light sources in the hinged light array panel 304.

Accordingly, as the hinged light array panel 304 is pivoted, the light sources 101 can still receive power over the one or more ribbon wire cables 908. Instead of a ribbon cable, mating connectors 820B,820F may be used to couple power to the light sources 101 between case portions of the case housing as is described with reference to FIGS. 8A-8B.

The resistors 902 provide some regulation of the current that from the one or more batteries 904. The charging connector 905 is provided so that the one or more batteries 904 can be to charged from an external power source. The charging connector 905 may be a standard universal serial bus (USB) connector or a micro USB connector.

Figure 10:
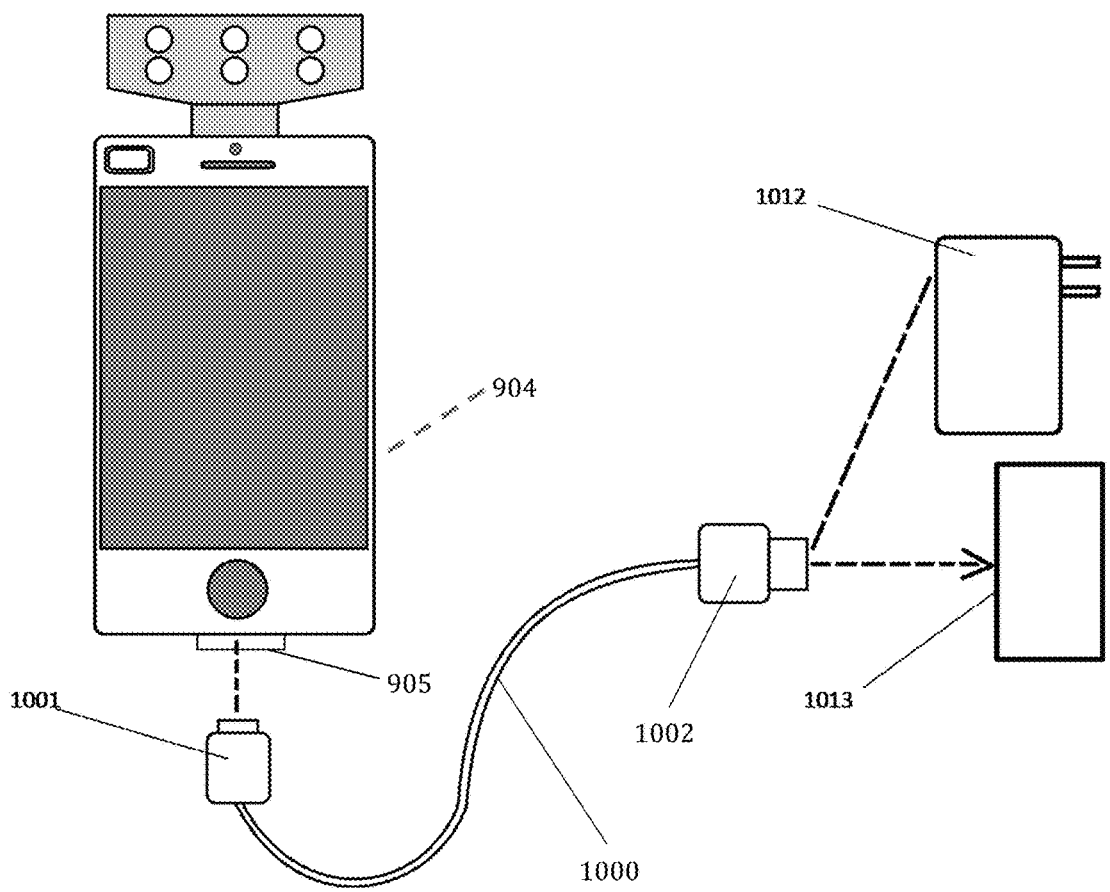
FIG. 10 illustrates a data connection/charging cable for recharging the one or more batteries in the external lighting accessory/case.

Referring now to FIG. 10, a diagram is shown as to how the one or more rechargeable batteries 904 in the external lighting accessory/case can be charged from an external power source. In an alternate embodiment, rechargeable batteries in the mobile digital camera device can be concurrently charged together with the one or more rechargeable batteries 904 in the external lighting accessory/case.

A data/charging cable 1000 with connectors/plugs 1001, 1002 is provided to charge the one or more batteries 904 of the external lighting accessory. The data/charging cable may charge the one or more batteries 904 while the external lighting accessory is used to provide lighting.

The first plug 1001 of a data/charging cable 1000 can plug into the charging connector 905 at the base of the external lighting accessory. A second plug 1002 of the data/charging cable 1000 at an opposite end can be plugged into either an AC power adaptor 1012, or a DC powered connector 1013. The plug 1002 may be a USB plug that can coupled into a universal serial bus (USB) port of a personal computer, a powered USB hub; a USB A/C power adapter; or a power over Ethernet (POE) USB connection port. The charging cable 1000 may be a micro-USB cable, for example, one plug being a micro-USB plug and another being a standard USB plug. In any case, the data/charging cable 1000 can couple between a power source and the external lighting accessory to charge its internal one or more rechargeable batteries 904.

The charging connector 905 of the external lighting accessory may be a through-port or through way connector and provide both a male and female charging connector of the same type used by the mobile device. The male charging connector 905 may plug into the female charging connector of the mobile device. The female charging connector 905 can couple to a male charging connector of the charging cable 1000 and thereby the external power source. To prevent the light sources from draining the battery of the mobile device, a one-way diode may be inserted between the male and female charging connector to prevent the reverse flow of current out of the mobile device. Accordingly, the one or more batteries 904 in the external lighting accessory/case may further be used to provide power and charge the mobile device, similar to the battery cases shown in U.S. Pat. No. 7,612,997 issued to Diebel et al on Nov. 3, 2009, and U.S. Pat. No. 8,390,255 issued to Andy Fathollahi on Mar. 5, 2013, both of which are incorporated herein by reference for all intents and purposes. A solar cell recharging case for a mobile device is shown and described in US Patent Application Publication No. 2003/0096642 filed by Bessa et al on Nov. 19, 2001 and incorporated herein by reference for all intents and purposes.

CONCLUSION

While embodiments of the invention have been particularly described, they should not be construed as limited by such embodiments. Instead, the embodiments of the invention should be construed according to the claims that follow below.

What is claimed is:

1. An apparatus comprising:
   a case housing to receive and embrace a mobile digital camera device to substantially protect it from mechanical damage, the case housing including
      a case back housing to protect a back side of the mobile digital camera device,
      a front bezel to couple to the case back housing portion, the front bezel surrounding an opening to expose a display device of the mobile digital camera device; and
      a plurality of light sources rotatably coupled to the case housing at a hinge, such that the plurality of lights are pointed towards the back of the mobile digital camera device in a folded position and are pointed towards the front of the mobile digital camera device when rotated 180 degrees, providing lighting for the one or more digital cameras of the mobile digital camera device;
         the plurality of light sources to provide lighting in a front and back field of view of the mobile digital camera device, each light source including
         a housing,
         a light emitting diode, and
         an optical element mounted to the housing over the light emitting diode;
   one or more batteries mounted in the case housing and coupled to each light emitting diode of each light source in the light array; and
   a light control device mounted in the case housing and coupled between the one or more batteries and each light emitting diode of each light source in the light array, the light control device to variably control the light intensity of the light provided by the light array.

2. The apparatus of claim 1, wherein
the case housing has a plurality of openings to allow user access to the function and the control devices of the mobile digital camera.

3. The apparatus of claim 1, wherein
the case back housing portion has a first electrical connector coupled to the one or more batteries and the light control device,
and the front bezel has a second electrical connector coupled to the light sources mounted in the front bezel,
wherein the first electrical connector and the second electrical connector couple together to couple the one or more batteries and the button to the light sources.

4. The apparatus of claim 1, wherein
the mobile digital camera device is a mobile phone, smart phone, or tablet computer.

5. The apparatus of claim 1, wherein
the optical element of each light source is a light diffusion cover to soften light generated by the light emitting diode.

6. The apparatus of claim 1, wherein
the optical element of each light source is a diffusion lens to direct and soften the light generated by the light emitting diode.

7. The apparatus of claim 1, wherein the case housing further includes
   a radio to wirelessly receive control instructions from the mobile digital camera device; and
   a processor coupled to the one or more batteries, the radio, and the light control device, the processor to receive the control instructions from the radio and control the light control device to variably control the light intensity of the light provided by the light array.

8. The apparatus of claim 1, wherein the one or more batteries are one or more rechargeable batteries and the apparatus further comprises:
a charging connector coupled to the one or more rechargeable batteries to receive a charge.

9. The apparatus of claim 8, wherein
the charging connector is a universal serial bus (USB) connector.

10. A smartphone case comprising:
a hollow housing to receive and protect a smartphone, the hollow housing having a plurality of openings to allow access to one or more user interface devices and controllable features of the smartphone and to allow capture of images with one or more digital cameras;
a plurality of light sources rotatably coupled to the housing at a hinge, such that the plurality of lights are pointed towards the back of the smartphone in a folded position and are pointed towards the front of the smartphone when rotated 180 degrees, providing lighting for the one or more digital cameras of the smartphone;
a plurality of optical elements respectively mounted to the housing over the plurality of light sources;
a battery mounted in the housing, the battery coupled to the plurality of light sources to energize the light sources to generate the lighting; and
a switch mounted in the housing, the switch coupled to and between the battery and the plurality of light sources to selectively energize the light sources and selectively generate the lighting.

11. A tablet case comprising:
a hollow housing to receive and protect a back and sides of a tablet computer device, the hollow housing having a plurality of openings to allow access to one or more user interface devices and controllable features of the tablet computer device and to allow capture of images with a digital camera;
a plurality of light sources rotatably coupled to the housing at a hinge, such that the plurality of lights are pointed towards the back of the tablet computer device in a folded position and are pointed towards the front of the when rotated 180 degrees, providing lighting for the digital camera of the tablet computer device;
a plurality of optical elements, respectively mounted to the housing over the plurality of light sources;
a battery mounted in the housing, the battery coupled to the plurality of light sources to energize the light sources to generate the lighting; and
a switch mounted in the housing, the switch coupled to and between the battery and the plurality of light sources to selectively energize the light sources and selectively generate the lighting.

12. The tablet case of claim 11, wherein
the battery is a rechargeable battery and the smartphone case further comprises a charging port mounted in the housing to receive a charging plug of a battery charger.

13. The tablet case of claim 12, wherein
the charging port is a universal serial bus connector.

14. The tablet case of claim 12, wherein
the plurality of light sources are mounted to a front of the housing in a bezel around an opening for a display device of the smartphone, the plurality of light sources providing lighting for a front digital camera of the smartphone.

15. The tablet case of claim 11, wherein
the plurality of optical elements are diffusion elements to soften light generated by the plurality of light sources.

16. The tablet case of claim 11, wherein
the plurality of optical elements are diffusion elements to soften light generated by the plurality of light sources.

17. The tablet case of claim 11, wherein
the plurality of optical elements are lenses to direct the light generated by the plurality of light sources.

18. The tablet case of claim 11, wherein
the plurality of optical elements are diffusing lenses to soften and direct the light generated by the plurality of light sources.

* * * * *